US010827568B2

(12) United States Patent
Lerosey et al.

(10) Patent No.: US 10,827,568 B2
(45) Date of Patent: Nov. 3, 2020

(54) MICROWAVE OVEN

(71) Applicants: Centre National de la Recherche Scientifique—CNRS, Paris (FR); Universite Paris Diderot-Paris 7, Paris (FR)

(72) Inventors: Geoffroy Lerosey, Paris (FR); Mathias Fink, Meudon (FR); Nadege Kaina, Villejuif (FR); Mathieu Dupre, Paris (FR)

(73) Assignees: Centre National de la Recherche Scientifique—CNRS, Paris (FR); Universite Paris Diderot-Paris 7, Paris (FR)

( * ) Notice: Subject to any disclaimer, the term of this patent is extended or adjusted under 35 U.S.C. 154(b) by 190 days.

(21) Appl. No.: 15/309,624

(22) PCT Filed: May 13, 2014

(86) PCT No.: PCT/IB2014/000888
§ 371 (c)(1),
(2) Date: Nov. 8, 2016

(87) PCT Pub. No.: WO2015/173601
PCT Pub. Date: Nov. 19, 2015

(65) Prior Publication Data
US 2017/0164429 A1 Jun. 8, 2017

(51) Int. Cl.
*H05B 6/64* (2006.01)
*H05B 6/70* (2006.01)
(Continued)

(52) U.S. Cl.
CPC ......... *H05B 6/6452* (2013.01); *H01P 1/2005* (2013.01); *H01Q 3/44* (2013.01);
(Continued)

(58) Field of Classification Search
CPC ........ H05B 6/705; H05B 6/6452; H05B 6/74; H01P 1/2005; H01Q 3/44; H01Q 15/002
See application file for complete search history.

(56) References Cited

U.S. PATENT DOCUMENTS 5,986,249 A 11/1999 Yoshino
6,469,286 B1 * 10/2002 Nobue .................. H05B 6/705
219/746
(Continued)

FOREIGN PATENT DOCUMENTS

EP 1096833 A1 5/2001
JP H11144862 A 5/1999
(Continued)

OTHER PUBLICATIONS

Daniel Frederic Sievenpiper; "High-Impedance Electromagnetic Surfaces"; Thesis; University of California, Los Angeles; 1999; pp. 1-162.
(Continued)

*Primary Examiner* — Ibrahime A Abraham
*Assistant Examiner* — John J Norton
(74) *Attorney, Agent, or Firm* — Miller, Matthias & Hull LLP

(57) ABSTRACT

A microwave oven comprising a cavity in which a material can be placed for heating and a magnetron for generating a microwave. The microwave oven further comprises an electromagnetic element adapted to interact with microwaves into the cavity and a control unit that provides a control signal to the electromagnetic element for modifying an impedance of the electromagnetic element during time of heating.

22 Claims, 2 Drawing Sheets

(51) Int. Cl.
  *H01P 1/20* (2006.01)
  *H01Q 15/00* (2006.01)
  *H01Q 3/44* (2006.01)
  *H05B 6/74* (2006.01)

(52) U.S. Cl.
  CPC ........... *H01Q 15/002* (2013.01); *H05B 6/705* (2013.01); *H05B 6/74* (2013.01); *Y02B 40/146* (2013.01)

(56) References Cited

U.S. PATENT DOCUMENTS

| | | | |
|---|---|---|---|
| 6,538,621 | B1 | 3/2003 | Sievenpiper et al. |
| 2002/0023922 | A1 | 2/2002 | Lee et al. |
| 2004/0025706 | A1 | 2/2004 | Greenstreet |
| 2004/0263408 | A1 | 12/2004 | Sievenpiper |
| 2005/0184067 | A1 | 8/2005 | Hu et al. |
| 2006/0151491 | A1 | 7/2006 | Kim et al. |
| 2006/0289534 | A1 | 12/2006 | Kim et al. |
| 2007/0181568 | A1 | 8/2007 | Blankenbeckler et al. |
| 2009/0090707 | A1 | 4/2009 | McNamee et al. |
| 2009/0109121 | A1* | 4/2009 | Herz ................. H01Q 15/14 343/912 |
| 2010/0133263 | A1 | 6/2010 | Toyoda et al. |
| 2010/0155392 | A1 | 6/2010 | Nordh et al. |
| 2010/0176123 | A1* | 7/2010 | Mihara .................. H05B 6/686 219/746 |
| 2010/0243646 | A1 | 9/2010 | Hershey et al. |
| 2010/0252551 | A1 | 10/2010 | Nordh et al. |
| 2010/0301041 | A1 | 12/2010 | Jeong |
| 2012/0012577 | A1 | 1/2012 | Jussel et al. |
| 2012/0103975 | A1* | 5/2012 | Okajima ............... H05B 6/6447 219/660 |
| 2012/0187115 | A1 | 7/2012 | Toyoda et al. |
| 2012/0206849 | A1 | 8/2012 | Chew et al. |
| 2013/0213956 | A1 | 8/2013 | Sorin |
| 2014/0027447 | A1 | 1/2014 | Huang et al. |

FOREIGN PATENT DOCUMENTS

| | | |
|---|---|---|
| JP | 2002093569 A * | 3/2002 |
| JP | 2002093569 A | 3/2002 |
| KR | 100270747 B1 | 11/2000 |
| KR | 20100031520 A | 3/2010 |

OTHER PUBLICATIONS

International Search Report for related International Application No. PCT/IB2014/000888; report dated Oct. 16, 2014.

* cited by examiner

US 10,827,568 B2

MICROWAVE OVEN

CROSS-REFERENCE TO RELATED APPLICATION

This Application is a 35 USC § 371 US National Stage filing of International Application No. PCT/IB2014/000888 filed on May 13, 2014.

FIELD OF THE DISCLOSURE

The present invention relates to a microwave oven, and more particularly, a microwave oven in which heating is electronically substantially uniform inside a cavity.

BACKGROUND OF THE DISCLOSURE

The present invention concerns more precisely a microwave oven comprising:
- a cavity in which a material can be placed for heating,
- a magnetron for generating a microwave, said magnetron being in communication with the cavity for propagating the microwaves from the magnetron to the cavity.

A microwave oven often provides uneven heating of the material, because the microwave radiation is not uniformly distributed inside the cavity. The microwaves are standing electromagnetic waves inside the cavity. The electric field inside the cavity comprises high variations in intensity, forming nodes concentrating the electric energy and antinodes with very small electric energy. This leads to heating variations from one location to an other location inside the cavity.

To improve the uniform heating of a material put inside a microwave oven, the following solutions are used:
- use of a turntable device to rotate the material inside the cavity; patent application US 2006/151491 gives an example of such a turntable device; or
- use a stirrer, a rotating antenna in the waveguide so as to change the source electromagnetic field, thereby changing the positions of the standing microwaves; patent applications US 2005/184067 and US 2006/289534 give examples of such microwave oven having a stirrer.

All these solutions are satisfactory, but still need to be improved.

SUMMARY OF THE DISCLOSURE

One object of the present invention is to provide a microwave oven that can have an uniform heating inside the cavity.

To this aspect, the microwave oven further comprises:
- an electromagnetic element adapted to interact with microwaves into the cavity, said electromagnetic element having an impedance that can be modified, and
- a control unit that provides a control signal to the electromagnetic element for modifying the impedance of the electromagnetic element during time of heating.

Thanks to these features, the standing waves inside the cavity can be modified. The positions inside the cavity of the electric field nodes and antinodes can be changed during time of heating. After the time duration of heating, each volume element inside the cavity experienced various configurations of exposure to electromagnetic waves (various amplitudes). The heating of the material is then more uniform. The position of antinodes (corresponding to minimum of electric field energy) is moved inside the cavity over time so as no volume element inside the cavity is exposed to a minimum of electromagnetic energy during the entire duration of the time of heating. Then, the material does not comprise portions having lack of heating In various embodiments of the microwave oven, one and/or other of the following features may optionally be incorporated.

In one aspect of the invention, the electromagnetic element situated on an inner surface of the cavity, said inner surface being chosen in a list comprising an inner wall of the cavity and a door for closing the cavity.

In one aspect of the invention, the electromagnetic element is situated inside the cavity, for example on a shelf.

In one aspect of the invention, the electromagnetic element is flat and has a thickness lower than 5 mm, and preferably lower than 3 mm.

In one aspect of the invention, the electromagnetic element comprises a diode connected at a first end to a resonator element and connected at a second end to an input port fed with the control signal.

In one aspect of the invention, the microwave generated by the magnetron is at a working frequency, and the electromagnetic element comprises:
- a first resonator element having a resonance at a at a first frequency, said second frequency being close to the working frequency, and
- a second resonator element having a resonance at a second frequency, said second frequency being tunable by a variable electric component from the working frequency to a frequency far from the working frequency.

In one aspect of the invention, the variable electric component is a diode or a capacitor or a transistor.

In one aspect of the invention, the control signal is a binary signal.

In one aspect of the invention, the control signal is a signal having a random characteristic over time.

In one aspect of the invention, the control signal is chosen in a list comprising a random signal, a pseudo-random signal, a pseudo-random binary signal.

In one aspect of the invention, the control signal is a periodic signal over time, said periodic signal comprising more than 100 values during the time of heating.

In one aspect of the invention, the oven further comprises a sensor inside the cavity, and the control signal is determined by the control unit on the bases of the sensed signal by said sensor.

In one aspect of the invention, the sensor is a thermal sensor.

In one aspect of the invention, the oven further comprises a plurality of sensors inside the cavity, and the control signal is determined by the control unit on the bases of the sensed signals delivered by said plurality of sensors.

In one aspect of the invention, the oven comprises a plurality of electromagnetic elements, each one adapted to interact with microwaves inside the cavity and each one having an impedance that can be modified, and wherein the control unit provides a plurality of control signals, each control signal being applied to one electromagnetic element of the plurality.

In one aspect of the invention, the oven comprises a first electromagnetic element situated on a first inner surface of the cavity, and a second electromagnetic element situated on a second inner surface of the cavity, wherein the first and second inner surfaces are chosen in a list comprising an inner wall of the cavity and a door for closing the cavity, and wherein the second inner surface is different than the first inner surface.

In one aspect of the invention, the plurality of electromagnetic elements is organized into at least one panel, said panel being situated on an inner surface of the cavity, said inner surface being chosen in a list comprising an inner wall of the cavity and a door for closing the cavity.

In one aspect of the invention, the panel is substantially a rectangular plate.

In one aspect of the invention, the panel comprises a matrix or lattice of electromagnetic elements.

In one aspect of the invention, the electromagnetic elements of the plurality are all identical, and situated at different location on inner surfaces of the cavity or inside the cavity.

In one aspect of the invention, at least two electromagnetic elements of the plurality are different, and situated at different location on inner surfaces of the cavity or inside the cavity.

In one aspect of the invention, the control signals of the plurality are uncorrelated one to an other one.

In one aspect of the invention, the oven further comprises a sensor inside the cavity, and the control signals are determined by the control unit on the bases of the sensed signal by said sensor.

BRIEF DESCRIPTION OF THE DRAWINGS

Other features and advantages of the invention will be apparent from the following detailed description of at least one of its embodiments given by way of non-limiting example, with reference to the accompanying drawings. In the drawings.

In the various figures, the same numeric references are used to indicate identical or similar elements.

DETAILED DESCRIPTION OF THE DISCLOSURE

Figure 1:
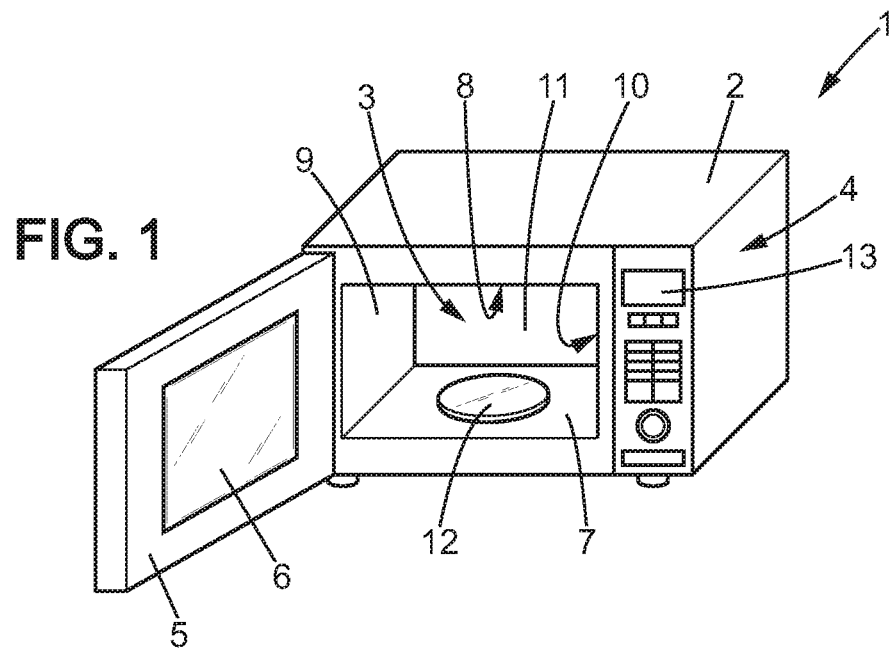
FIG. 1 is a perspective view of a microwave oven.
Figure 2:
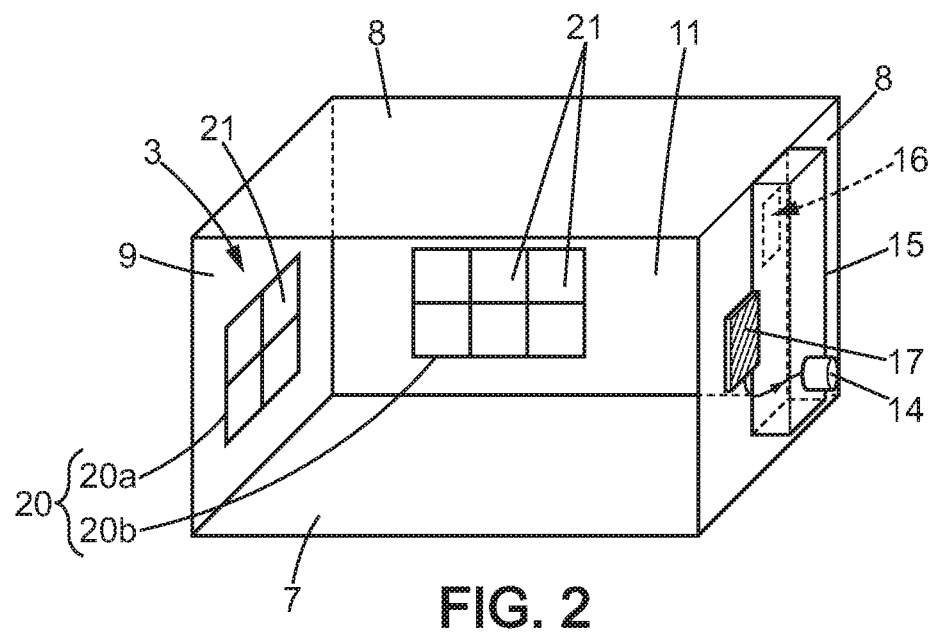
FIG. 2 is a perspective view of a cavity and electric compartment of a microwave oven according to the invention.

As illustrated on FIGS. 1 and 2, the microwave oven 1 includes:

a casing 2 having a cavity 3 for heating a material placed into said cavity for heating said material, and an electric compartment 4 beside the cavity 3; and a door 5 hingeably connected to one side of the casing for opening and closing the cavity, the door eventually comprising a window 6 so as a user can see the material inside the cavity when the door is closed.

The cavity 3 has a general parallelepiped shape, and comprises a bottom wall 7, a top wall 8 and three side walls, i.e. a left side wall 9, a right side wall 10, and a back side wall 11. All these walls are inner walls of the cavity.

The bottom wall 7 may optionally be equipped with a turntable device 12 for rotating the material during the heating.

The electric compartment 4 comprises:

a front panel 13 having a plurality of buttons for controlling the microwave oven 1 and eventually a display for showing informations to the user, a magnetron 14 for generating the microwave, a wave guide 15 for guiding the microwave generated by the magnetron 14 to the cavity, an opening 16 between the wave guide 15 and the cavity 3 for radiating the microwaves inside the cavity, a control unit 17 connected to the front panel 13 for receiving at least the heating mode, and connected to the magnetron 14 for controlling the heating of the material.

The microwave oven 1 also comprises a power supply for feeding electricity energy to the control unit 17 and to the magnetron 14.

The material placed inside the cavity 3 may be any material that can be heated via microwaves, such as food, liquid, etc. . . .

The microwave oven 1 according to the invention further comprises at least one electromagnetic element 21 that can interact with the microwave into the cavity 3, said electromagnetic element 21 having an electromagnetic impedance that can be modified.

The electromagnetic element 21 is adapted to interact with microwaves, i.e. it is adapted to reflect and/or transmit the microwave. The modification of its electromagnetic impedance changes microwave amplitude and/or microwave phase (relative to an incident microwave).

Additionally, the control unit 17 provides a control signal to the electromagnetic element 21 for modifying an electromagnetic impedance of said electromagnetic element during time of heating.

The time of heating is a duration controlled by the control unit 17, during which the control unit 17 controls the emission of microwave by the magnetron 14 inside the cavity 3 for heating the material.

Thanks to the impedance modifications of the electromagnetic element 21 during the time of heating, the electromagnetic boundary conditions inside the cavity are modified and the positions inside the cavity of electric field nodes and antinodes can be moved several times.

The standing microwaves establish inside the cavity at a relatively high speed, i.e. in a time period lower than few microseconds, or even lower than one microsecond. It is then possible to modify the impedance of the electromagnetic element 21 several times during the time of heating, and for example every milliseconds or less. The control signal can comprise during this time of heating more than 1000 values, or more than 10,000 values. The heating is then more uniform or homogenized.

Theses standing microwaves increase the accumulated energy and increase heating. However, the electric field antinodes cause particular locations inside the cavity that accumulate a low level of electromagnetic energy (intensity). These particular locations have poor heating properties compared to other locations inside the cavity. The heating of the material is correlated to a time integral of electromagnetic energy at each location inside the material. Moving the electric field nodes and antinodes is then globally beneficial for having a uniform heating of the material.

The electromagnetic element 21 may implement at its location any one of the following boundary condition to the electromagnetic wave field:

a null tangential electric field if it is a purely electric conductor, or a null tangential magnetic field if it is a high impedance element, or any other electromagnetic condition.

The electromagnetic element 21 may be designed according to various designs for modifying its impedance.

According to a variant, the electromagnetic element 21 may comprise a variable capacitor, said variable capacitor being controllable by a control electric potential given via the control signal.

According to a variant, the electromagnetic element 21 may comprise a diode having one end connected to a resonator element and a second end connected to an input port fed with the control signal.

According to a variant the electromagnetic element 21 comprises two separate resonator elements. The first resonator resonates at a at a first frequency $f_1$ and the second resonator resonates at a second frequency $f_2$ which is different from the first frequency, said second frequency $f_2$ also being tunable by a variable electric component, such as a variable capacitor or a variable diode. Such a electromagnetic element 21 allows reflecting an incident wave (microwave) with a positive sign or a negative sign, depending on whether the second frequency $f_2$ is close to or far from the first frequency $f_1$.

According to a variant, the electromagnetic element 21 has a single polarization type or two polarization types. In the second case, the electromagnetic element 21 comprises resonator elements of the first and second polarization types. The electromagnetic element 21 then can interact with an incident wave corresponding to its polarization type or both.

According to a variant, the electromagnetic element 21 has a single resonance frequency or two or a plurality of resonance frequencies. The electromagnetic element 21 then allows controlling a frequency range or a frequency band, or a plurality of frequency bands depending on the proximity of the frequencies in the plurality. The electromagnetic element 21 then can interacts with an incident wave over a predetermined frequency band, which may be a wide frequency band if the set of resonator elements covers this frequency band.

According to a variant, the electromagnetic element 21 may comprise only two different states. The electromagnetic element 21 is therefore a binary element. The two states may be a phase shift of modified wave regards to the incident wave, or may be an amplitude shift of modified wave regards to the incident wave. Thanks to these only two states, the electromagnetic element 21 is very easy to control.

In case of phase shifts, the electromagnetic element 21 may reflect or transmit the incident wave into a modified wave having a phase shift relative to the incident wave, said phase shift being preferably of zero radian for the first state (meaning that the modified wave do not have is phase modified) and π radians for the second state (meaning that the modified wave has his phase shifted of π radian, i.e. is the opposite wave).

Alternatively, the phase shift is of alpha radians for the first state (alpha being an angle value between zero and π) and alpha+π radians for the second state.

In case of amplitude shift, the electromagnetic element 21 may reflect or transmit the incident wave into a modified wave having an amplitude shift relative to the incident wave (amplification coefficient), said amplitude shift being preferably of zero for the first state (meaning that the modified wave is null) and one for the second state (meaning that the modified wave is identical to the incident wave).

Additionally, more than two states can also be used for having more flexibility.

The electromagnetic element 21 is for example an electric or electronic component having a flat shape.

The electromagnetic element 21 can be situated on any inner surface of the cavity (e.g. it can be secured or stick or integrated into portion elements of said surface): Said inner surface can be an inner wall of the cavity, such as the bottom wall 7, top wall 8, left side wall 9, right side wall 10 and back side wall 11, or it can be the door 5 of the oven. The electromagnetic element 21 can be transparent or not. It can be masked by any portions of said inner surface. For example, the door frame may mask the electromagnetic element 21 situated on or integrated inside said door 5.

Eventually, the electromagnetic element 21 can be situated inside the cavity itself. For example, it can be integrated inside or on a shelf separating the cavity into two or more compartments. The electromagnetic element has a small thickness, for example lower than 5 mm, and preferably lower than 3 mm.

The control unit 17 may provide a control signal to the electromagnetic element 21 that comprises a random characteristic over time. This signal is changing over time, randomly.

The random time variation of the control signal insures that the electromagnetic impedance of the electromagnetic element 21 is always changing during the time of heating. These changes during time the electromagnetic field inside the cavity 3, and therefore, no steady states waves can arise inside said cavity. The heating inside the cavity 3 is more uniform inside the volume of the cavity.

Advantageously, the control signal is chosen in a list comprising a random signal, a pseudo-random signal, and a pseudo-random binary signal.

Optionally, the control signal is a periodic signal over time. It may comprise more than 1000 different values memorized by the control unit. A time rate for reading these values is also predetermined into the control unit. The values and the time rate may depend on the heating mode programmed by the user on the microwave oven.

Eventually, the control signal is only a binary signal, having two states, e.g. having a zero volt state and a 5 volts state, such binary signal being provided for example via a simple logic circuit or a microcontroller or any control unit circuit. The controlled electromagnetic element of the invention is therefore not expensive and less expensive than prior art solutions for heating homogenisation.

According to an embodiment (as shown on FIG. 2), the microwave oven may comprise a plurality of electromagnetic elements 21, each one being adapted to interact with microwaves inside the cavity and each one having an impedance that can be modified. The control unit 17 provides an identical or preferably a different control signal to each electromagnetic element 21 of the plurality.

Each control signal (one for each electromagnetic element) is advantageously a random or periodic signal over time as disclosed above, and over the plurality of electromagnetic elements.

The electromagnetic field inside the cavity is modified many times during the time of heating. For example, the electromagnetic field (positions of electric field nodes and antinodes) is modified more than 100 times during the time of heating, and eventually more than 1000 times. The electric energy is then more uniformly spread inside the volume of the cavity (homogenized), and the heating of the material is then more uniform.

The control signals are advantageously uncorrelated signals so as the impedance of each electromagnetic element 21 is modified independently to an other electromagnetic element of the plurality. Then, the uniformity of heating inside the cavity is improved.

For example, the microwave oven may comprise:
a first electromagnetic element 21a situated on a first inner surface of the cavity (any one of the above cited list), and
a second electromagnetic element 21b situated on a second inner surface of the cavity, said second inner surface being different than the first inner surface.

The electromagnetic elements 21 (a group of them) installed on an inner surface (or inner wall) may be organized into one panel 20a, said panel 20a being situated on an inner surface of the cavity 3. Installation of the group or plurality of electromagnetic elements 21 is then facilitated.

For example (as illustrated on FIG. 2), the microwave oven 1 may comprise a first panel 20a and a second panel 20b, each one composed of a plurality of electromagnetic elements 21. All the electromagnetic elements 21 are controlled by the control unit 17 by a control signal. The control signals may be set up in parallel or set up in series and multiplexed.

The panels 20a, 20b form an electromagnetic active surface component 20 connected to and controlled by the control unit 17 of the microwave oven 1.

Each panel 20a, 20b is for example substantially a rectangular plate.

Each panel 20a, 20b may comprise a matrix of electromagnetic elements 21, said matrix being composed of rows and columns. Eventually, the panels comprise a lattice of electromagnetic elements 21 organized according to a defined pattern. Lots of known patterns exist.

All the electromagnetic elements 21 may be identical or not (different).

Additionally, the oven may further comprise a sensor inside the cavity, and the control signal(s) is (are) determined by the control unit 17 on the bases of the sensed signal by said sensor. The sensor may be a thermal or electromagnetic sensor. Eventually, the oven may comprise a plurality of sensors for determining the control signals. The algorithm implemented by the control unit 17 may be any optimization (maximization) algorithm for the sensed signal(s).

Figure 3:
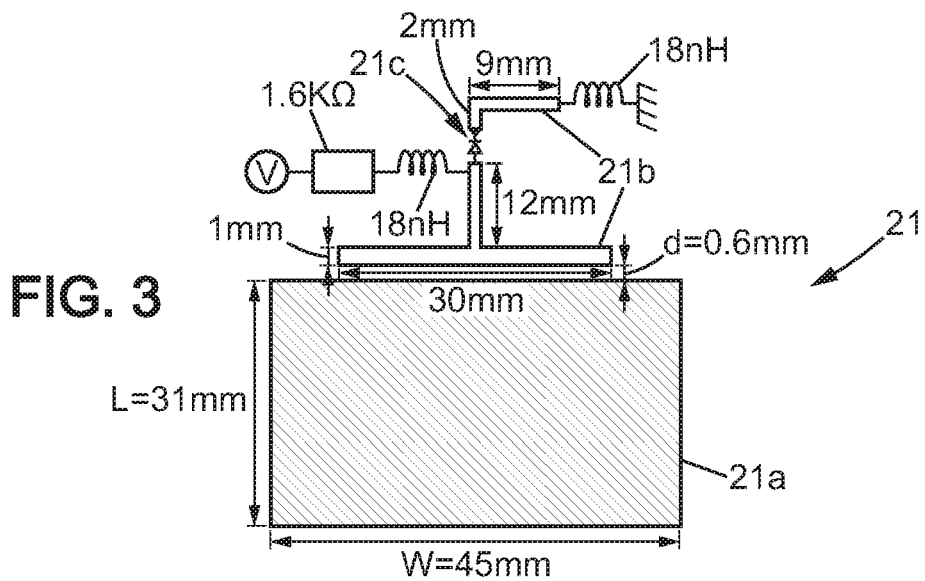
FIG. 3 is a view of a first example of an electromagnetic element that can be used in the microwave oven of FIG. 2.

FIG. 3 shows a first example of design of an electromagnetic element 21 that can be used inside the oven.

The electromagnetic element 21 is for example a planar resonator and is able to reflect the waves with a controllable phase shift. It comprises resonators that sit on a ground plane since they will anyway be placed on walls, which are ground planes albeit poor ones. For the sake of simplicity, we opt for the simplest case of a binary phase modulation, that is, a two states resonator that reflects the waves either positively or negatively.

To do so, the electromagnetic element 21 comprises for example a resonator that presents a resonance frequency $f_{ref}$ which can be shifted using an electronic circuit. If the resonance frequency $f_{ref}$ is set such that it corresponds to the working frequency $f_0$, the resonator reflects the waves at this frequency with a π phase shift. Now when its resonance frequency is shifted away from $f_0$, the resonator is transparent and the ground plane reflects the waves with a 0 phase shift. In present case, the working frequency the working frequency is near $f_0$=2.47 GHz, that is, 6 cm.

On FIG. 3, the design is a little more complicated, and consists in two strongly coupled or hybridized resonators. The first resonator 21a is called reflecting resonator and is polarized along its short axis which resonance frequency $f_{ref}$ is set to the working frequency $f_0$, while the second resonator 21b is a parasitic strip resonator whose resonance frequency $f_{par}$ can be electronically tuned from the working frequency $f_0$ to a higher frequency $f_1$ using a diode 21c.

Doing so, when the resonance frequency $f_{par}$ is set to the higher frequency $f_1$, the reflector resonance frequency $f_{ref}$ is unchanged and it reflects the waves with a π phase shift (π-state). On the contrary when the resonance frequency $f_{par}$ is shifted to the working frequency $f_0$, the two resonators hybridize and a dimmer presenting two resonant frequencies f− and f+ around $f_0$ is created. In this state, at the working frequency $f_0$, the dimmer is again transparent and the waves are reflected by the ground plane with a 0 phase shift (0-state).

This design presents notable advantages: the reflection properties of the electromagnetic element 21 are insensitive to both the losses and impedance variations of the electronic components and to the soldering which are placed on the parasitic resonator only.

Figure 4A:
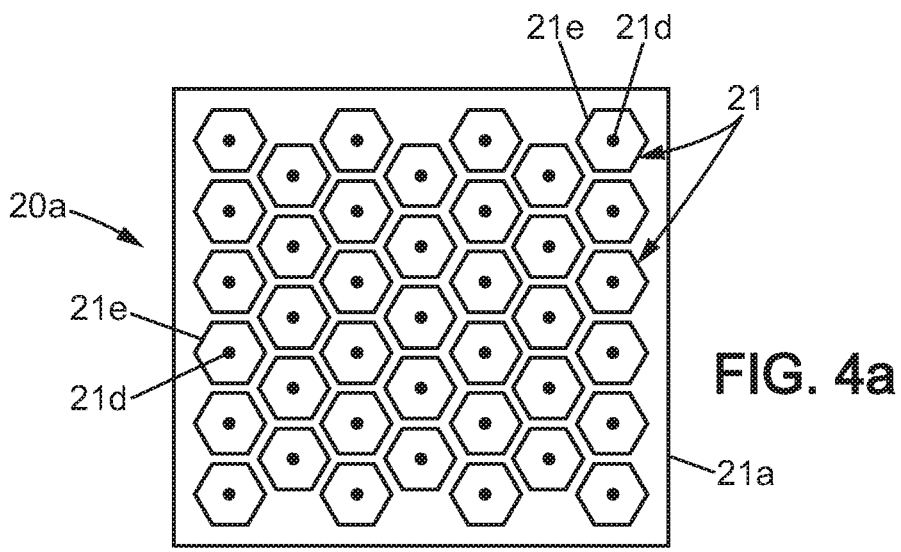
FIGS. 4a and 4b are top and lateral views of second example electromagnetic elements that can be used in the microwave oven of FIG. 2.
Figure 4B:
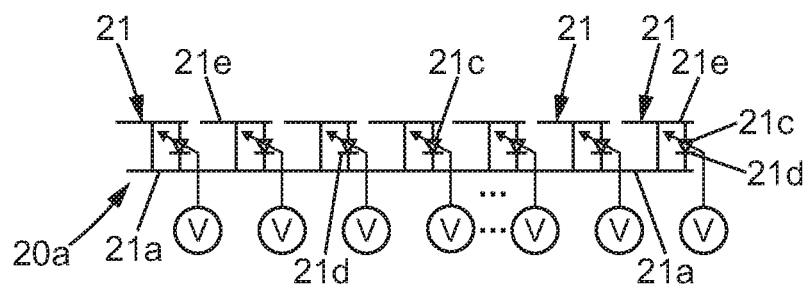

FIGS. 4a and 4b show a second example of design of an electromagnetic element 21 that can be used inside the oven. The figures show a panel 20a having a matrix or lattice of electromagnetic elements 21. This kind of panel is known as a high impedance surface. The electromagnetic elements 21 are set above a conductive surface 21a (ground surface), and modifies the propagation of surface waves.

In the example, each one of the electromagnetic elements 21 have a mushroom form extending from the conductive surface 21a and comprise a substantially vertical pillar 21d supporting a plate 21e. The pillar 21d behaves as an inductor while the neighbour plates behaves as a capacitor, so as each electromagnetic element 21 behaves as a resonant LC circuit coupled to a neighbour one.

As seen on FIG. 4b, each electromagnetic element 21 (an end of the upper plate 21e) is for example linked to the conductive surface 21a via a controllable diode 21c or any variable electronic component (a diode, a transistor, a capacitor) so as to modify the impedance of the electromagnetic element 21. Depending on the conductivity of the variable electronic component controlled by an input port V, the electromagnetic element 21 may switch to various states, and for example from a perfect electric conductor PEC behaviour to a perfect magnetic conductor PMC behaviour.

The invention claimed is:

1. A microwave oven, comprising:
 a cavity in which a material can be placed for heating,
 a magnetron for generating a microwave, said magnetron being in communication with the cavity for propagating the microwaves from the magnetron to the cavity,
 said microwave oven being characterized in that it further comprises:
 an electromagnetic element placed inside said cavity and is adapted to interact with microwaves into the cavity, said electromagnetic element having an impedance that can be modified, and said electromagnetic element being an electric component and being adapted to reflect microwaves with a controllable amplitude shift and/or phase shift, and
 a control unit that provides a control signal to the electromagnetic element for modifying the impedance of the electromagnetic element during time of heating.

2. The oven according to claim 1, wherein the electromagnetic element is situated on an inner surface of the cavity, said inner surface being chosen from a list comprising an inner wall of the cavity and a door for closing the cavity.

3. The oven according to claim 1, wherein the electromagnetic element is flat and has a thickness lower than 5 mm.

4. The oven according to claim 1, wherein the electromagnetic element comprises a diode connected at a first end to a resonator element and connected at a second end to an input port fed with the control signal.

5. The oven according to claim 1, wherein the microwave generated by the magnetron is at a working frequency, and the electromagnetic element comprises:
   a first resonator element having a resonance at a first frequency, said first frequency being at the working frequency, and
   a second resonator element having a resonance at a second frequency, said second frequency being tunable by a variable electric component from the working frequency to a frequency not at the working frequency.

6. The oven according to claim 5, wherein the variable electric component is a diode or a capacitor or a transistor.

7. The oven according to claim 1, wherein the control signal is a binary signal.

8. The oven according to claim 1, wherein the control signal is a signal having a random characteristic over time.

9. The oven according to claim 8, wherein the control signal is chosen from a list comprising a random signal, and a pseudo-random signal, a pseudo-random binary signal.

10. The oven according to claim 1, wherein the control signal is a periodic signal over time, said periodic signal comprising more than 100 values during the time of heating.

11. The oven according to claim 1, further comprising a sensor inside the cavity, and the control signal is determined by the control unit on the bases of the signals sensed by said sensor.

12. The oven according to claim 11, wherein the sensor is a thermal sensor.

13. The oven according to claim 1, further comprising a plurality of sensors inside the cavity, and the control signal is determined by the control unit on the bases of the sensed signals delivered by said plurality of sensors.

14. The oven according to claim 1, wherein it comprises a plurality of electromagnetic elements, each one adapted to interact with microwaves inside the cavity and each one having an impedance that can be modified, and wherein the control unit provides a plurality of control signals, each control signal being applied to one electromagnetic element of the plurality.

15. The oven according to claim 14, wherein it comprises a first electromagnetic element situated on a first inner surface of the cavity, and a second electromagnetic element situated on a second inner surface of the cavity, wherein the first and second inner surfaces are chosen from a list comprising an inner wall of the cavity and a door for closing the cavity, and wherein the second inner surface is different than the first inner surface.

16. The oven according to claim 14, wherein the plurality of electromagnetic elements is organized into at least one panel, said panel being situated on an inner surface of the cavity, said inner surface being chosen from a list comprising an inner wall of the cavity and a door for closing the cavity.

17. The oven according to claim 16, wherein the panel is a rectangular plate.

18. The oven according to claim 16, wherein the panel comprises a matrix or lattice of electromagnetic elements.

19. The oven according to claim 14, wherein the electromagnetic elements of the plurality are all identical, and situated at different locations on inner surfaces of the cavity or inside the cavity.

20. The oven according to claim 14, wherein at least two electromagnetic elements of the plurality are different, and situated at different locations on inner surfaces of the cavity or inside the cavity.

21. The oven according to claim 14, wherein the control signals of the plurality are uncorrelated one to another.

22. The oven according to claim 14, further comprising a sensor inside the cavity, and the control signals are determined by the control unit on the bases of the signals sensed by said sensor.

* * * * *